(12) United States Patent
Zheng

(10) Patent No.: US 10,020,643 B2
(45) Date of Patent: Jul. 10, 2018

(54) STRUCTURE OF SWITCHGEAR WITH ARC ELIMINATOR

(71) Applicant: LSIS CO., LTD., Anyang-si, Gyeonggi-do (KR)

(72) Inventor: Menglei Zheng, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/151,420

(22) Filed: May 10, 2016

(65) Prior Publication Data

US 2017/0018913 A1   Jan. 19, 2017

(30) Foreign Application Priority Data

Jul. 15, 2015  (KR) .................. 10-2015-0100626

(51) Int. Cl.
| | | |
|---|---|---|
| *H02B 13/065* | (2006.01) | |
| *H02B 13/025* | (2006.01) | |
| *H02B 11/26* | (2006.01) | |
| *H02B 11/173* | (2006.01) | |
| *H01H 79/00* | (2006.01) | |

(52) U.S. Cl.
CPC ......... *H02B 13/065* (2013.01); *H02B 11/173* (2013.01); *H02B 11/26* (2013.01); *H02B 13/025* (2013.01); *H01H 79/00* (2013.01)

(58) Field of Classification Search
CPC ....... H02B 11/02; H02B 11/173; H02B 11/24; H02B 11/26; H02B 13/025; H02B 13/065; H02B 13/075; H01H 79/00
USPC ...................... 361/600–678, 1–60
See application file for complete search history.

(56) References Cited

U.S. PATENT DOCUMENTS

| | | | | |
|---|---|---|---|---|
| 8,598,484 B2 * | 12/2013 | Engel | ............... | H02B 11/12 |
| | | | | 218/157 |
| 8,604,368 B2 * | 12/2013 | Kim | ............... | H02B 11/24 |
| | | | | 200/50.22 |
| 9,172,222 B2 * | 10/2015 | Bozek | ............... | H02B 11/26 |

FOREIGN PATENT DOCUMENTS

| | | |
|---|---|---|
| CN | 102683098 | 9/2012 |
| CN | 202997396 | 6/2013 |
| CN | 204407887 | 6/2015 |
| JP | 3086902 | 7/2002 |
| JP | 3088203 | 9/2002 |
| JP | 2011055650 | 3/2011 |
| JP | 2012120343 | 6/2012 |
| KR | 100423886 | 3/2004 |
| KR | 100984509 | 9/2010 |
| KR | 100996627 | 11/2010 |

(Continued)

OTHER PUBLICATIONS

European Patent Office Application Serial No. 16169354.4, Search Report dated Dec. 5, 2016, 8 pages.

(Continued)

*Primary Examiner* — Zachary M Pape
(74) *Attorney, Agent, or Firm* — K&L Gates LLP

(57) ABSTRACT

The present invention relates to a structure of a switchgear with an arc protection system including an arc optical sensor to detect an arc, a relay to determine an occurrence or non-occurrence of a fault current by receiving an arc signal detected by the arc optical sensor, and an arc eliminator to earth an arc-generated side bus bar in response to an operating signal with respect to the determined fault current, wherein the arc eliminator has a test position or a service position within the switchgear.

5 Claims, 8 Drawing Sheets

(56) References Cited

FOREIGN PATENT DOCUMENTS

| KR | 101013064 | 2/2011 |
|----|-----------|--------|
| KR | 101229746 | 2/2013 |
| WO | 2011116985 | 9/2011 |
| WO | 2015178160 | 11/2015 |

OTHER PUBLICATIONS

ABB, "UniGear type ZS1", XP055322812, dated Apr. 30, 2003, 60 pages.
State Intellectual Property Office of the People's Republic of China Application Serial No. 201610529881.5, Office Action dated Oct. 30, 2017, 7 pages.

* cited by examiner

RISER PNL STRUCTURE

STRUCTURE OF SWITCHGEAR WITH ARC ELIMINATOR

CROSS-REFERENCE TO RELATED APPLICATION

Pursuant to 35 U.S.C. § 119(a), this application claims the benefit of an earlier filing date of and the right of priority to Korean Application No. 10-2015-0100626, filed on Jul. 15, 2015, the contents of which are all incorporated by reference herein in its entirety.

BACKGROUND OF THE INVENTION

1. Field of the Invention

This specification relates to a structure of a switchgear, and more particularly, a structure of a switchgear with an arc eliminator, capable of repairing and maintaining the arc eliminator even in an active state of an upper circuit breaker without breaking it, by mounting the arc eliminator in the switchgear in a pushing and pulling manner.

2. Background of the Invention

In general, when an arc fault (arc flash) is generated in a switchgear, a person located outside may be put in danger. Most of arc energy which is very great damages the switchgear and the damaged switchgear cannot be reused. This may bring about a user's great loss from the economic perspective.

An arc eliminator is a high-speed earthing switch with closing capability. Once an arc flash is generated in a switchgear, an optical sensor installed near the switchgear immediately detects the generated arc fault. Accordingly, an exclusive relay sends an operating signal to an arc eliminator such that the arc eliminator can perform an earthing operation.

The fault current is discharged through the earthing operation and thus the arc is automatically eliminated at the fault-generated point.

Therefore, the arc eliminator should be connected to a bus bar in order to eliminate the fault current. Although not illustrated, the arc eliminator and the bus are connected by the following three methods.

For an installation at an upper portion as a first connecting method, the arc eliminator is installed at an upper portion of a bus bar compartment of a circuit breaker panel and connected directly to a bus bar.

For an installation at a lateral surface as a second connecting method, the arc eliminator is installed at a side of a bus bar compartment of a switchgear and connected directly to a bus bar.

For an installation of an arc eliminator-exclusive panel as a third connecting method, one arc eliminator panel is installed at a side of a circuit breaker panel, and the arc eliminator is installed at the arc eliminator panel. In this instance, a bus bar compartment of the exclusive panel is connected to a bus bar compartment of another circuit breaker panel.

As such, since the arc eliminator is connected directly to the bus bar in the related art, the maintenance of the arc eliminator is allowed only after opening an upstream circuit breaker, other load sides are powered off as well.

For the installation of the arc eliminator at the upper portion of the bus bar compartment, the arc eliminator is located higher than a reference switchgear and an arc discharge device installed in the bus bar compartment should be re-located at another position.

In addition, for the lateral installation of the arc eliminator, it is difficult to further ensure an installation space of the switchgear.

SUMMARY OF THE INVENTION

Therefore, an aspect of the detailed description is to provide a structure of a switchgear with an arc eliminator, capable of minimizing a loss caused due to an arc fault by preventing the arc fault, and repairing and maintaining the switchgear with an arc eliminator mounted therein in a pushing and pulling manner.

To achieve these and other advantages and in accordance with the purpose of this specification, as embodied and broadly described herein, there is provided a structure of a switchgear with an arc eliminator, in a structure of a switchgear comprising an arc optical sensor to detect an arc, a relay to determine an occurrence or non-occurrence of a fault current by receiving an arc signal detected by the arc optical sensor, and an arc eliminator to earth an arc-generated side bus bar in response to an operating signal with respect to the determined fault current, wherein the arc eliminator is coupled to a cradle conveyer to be horizontally movable back and forth within the switchgear so as to be located at a test position or a service position.

The structure of the switchgear may be provided on the same panel together with the arc eliminator according to one of an upstream bus bar structure, a downstream bus bar structure, a riser panel structure, a tie panel structure and a cable insert structure.

The structure of the switchgear may include, in addition to the arc eliminator disposed therein, a plurality of tulip contacts provided on a front surface, a shutter-driving device provided on a side surface, a cradle conveyer provided at a lower surface, and bushings contactable with the tulip contacts.

The arc eliminator may be placed at the service position in a manner that the arc eliminator moves along rails, the shutter-driving device opens a shutter plate obscuring the bushings, and the tulip contacts are inserted into the bushings to be brought into contact with internal conductors.

The riser panel structure may be a structure in which the arc eliminator is connected between an upstream bus bar and a downstream bus bar.

The tie panel structure may be configured such that the arc eliminator is connected between an upstream bus bar and a downstream bus bar, and a tie panel circuit breaker is connected between one of the upstream bus bar and the downstream bus bar and the arc eliminator.

The cable insert structure may be configured such that the arc eliminator is connected to a downstream bus bar, and a main circuit breaker is provided between the arc eliminator and the cable insert structure.

A structure of a switchgear with an arc eliminator according to the present invention can minimize a loss caused due to an arc fault by preventing the arc fault, and allow maintenance of the switchgear with the arc eliminator which is provided therein in a pushing and pulling manner.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a structure of a switchgear with an arc eliminator according to the present invention, with reference to the accompanying drawings.

Figure 1:
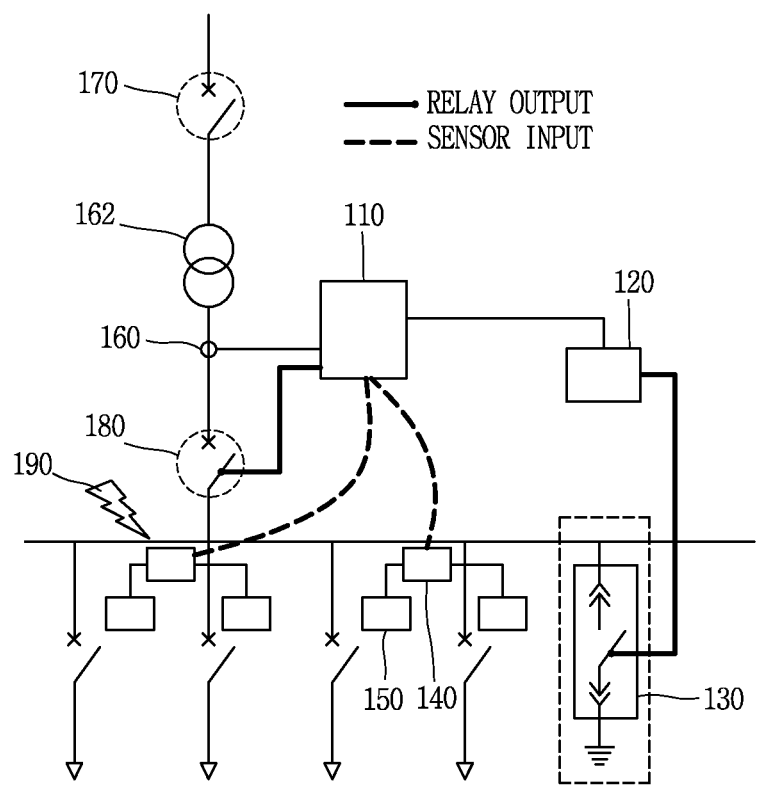
FIG. 1 is a configuration view schematically illustrating an arc protection system (APS) in accordance with the present invention.

FIG. 1 is a configuration view schematically illustrating an arc protection system (APS) in accordance with the present invention.

As illustrated in FIG. 1, the arc protection system according to the present invention may include a relay 110, an arc eliminator control device 120 connected to the relay 110, an arc eliminator 130 connected to the arc eliminator control device 120 and receiving an operating current applied from the arc eliminator control device 120, an arc optical sensor 150 detecting an arc fault (or arc flash) 190, a slave 140 sending the detected arc fault signal to the relay 110, a current transformer 160 connected to the relay 110, a transformer 162 and an upstream circuit breaker (CB) 170 both connected to one side of the current transformer 160, and a main circuit breaker 180 connected to another side of the current transformer 160.

Here, the current transformer 160 connected to the relay 110 may measure a level of a secondary current of the transformer 162. When a secondary overcurrent or a fault current of the transformer 162 flows, the current transformer 160 transmits a signal to the relay 110 and operates the main circuit breaker 180.

The transformer 162 is a device which transforms a high voltage into a low voltage, and may refer to a distribution type transformer.

The upstream circuit breaker 170 is a primary protection device of the transformer 162, and the main circuit breaker 180 is a secondary protection device of the transformer 162.

In the arc protection system having such configuration according to the present invention, when the arc fault 190 is generated on a bus bar of the switchgear, the arc optical sensor 150 which is installed at a corresponding panel detects the arc fault 190, and transmits a signal to the relay 110 through the slave 140.

Simultaneously, the relay 110 recognizes the fault current through the current transformer 160 and transmits an operating signal to the arc eliminator control device 120. The arc eliminator control device 120 then fast transmits an operating signal to the arc eliminator 130.

In this instance, the arc eliminator 130 operates to earth the bus bar. And, the fault current which causes the arc then flows on the ground through an earthing circuit. The arc is thus automatically eliminated at a portion where the arc is generated.

Figure 2:
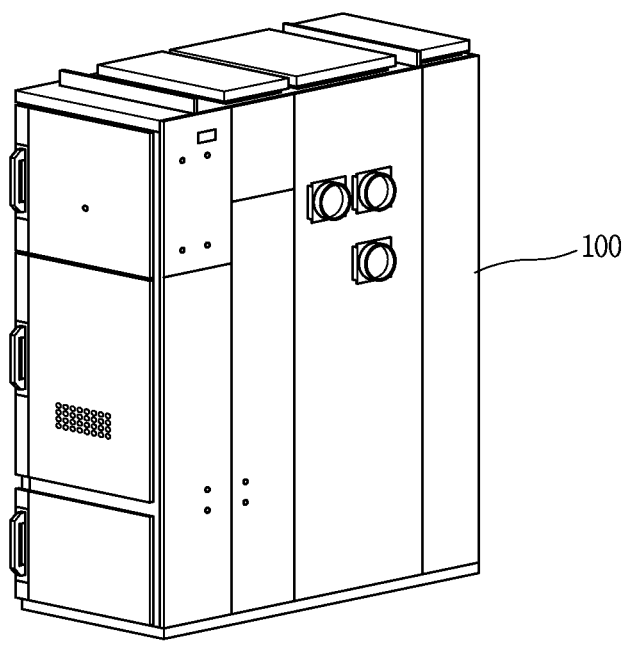
FIG. 2 is a perspective view schematically illustrating a structure of a switchgear with an arc eliminator in accordance with the present invention.

FIG. 2 is a perspective view schematically illustrating a structure of a switchgear 100 with an arc eliminator in accordance with the present invention.

As illustrated in FIG. 2, the arc eliminator 130 is disposed within the switchgear 100 according to the present invention.

Figure 3:
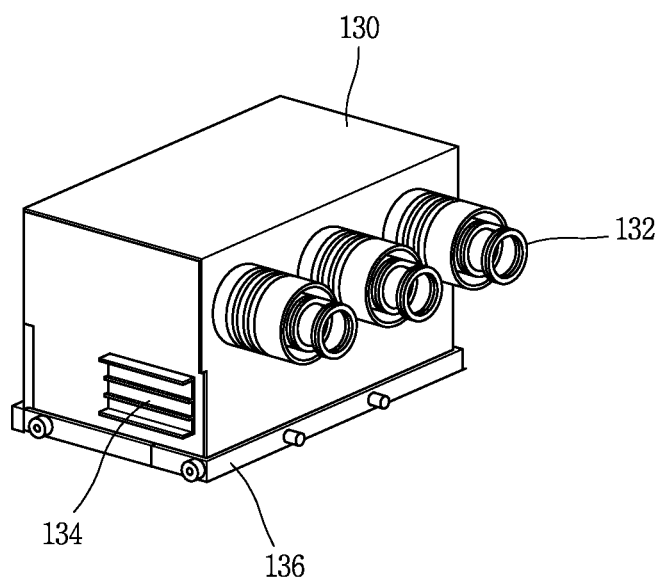
FIG. 3 is a schematic view illustrating a configuration of the arc eliminator in the structure of the switchgear with the arc eliminator in accordance with the present invention.

FIG. 3 is a schematic view illustrating a configuration of the arc eliminator in the structure of the switchgear with the arc eliminator in accordance with the present invention.

As illustrated in FIG. 3, the arc eliminator 130 disposed within the switchgear 100 according to the present invention may include a plurality of tulip contacts 132 provided on a front surface thereof, a shutter-driving device 134 provided on a side surface, and a cradle conveyer 136 provided on a lower surface thereof.

Figure 4:
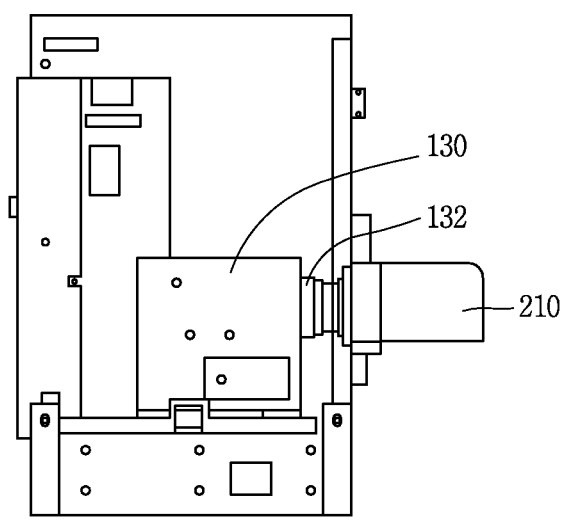
FIG. 4 is a lateral view of the structure of the switchgear with the arc eliminator in accordance with the present invention, which schematically illustrates a state that the arc eliminator is separated from a bushing.

FIG. 4 is a lateral view of the structure of the switchgear with the arc eliminator in accordance with the present invention, which schematically illustrates a state that the arc eliminator is separated from bushings.

As illustrated in FIG. 4, when the arc eliminator 130 is mounted within the switchgear 100, the arc eliminator 130 is located at a test position where the arc eliminator 130 is not connected to rear bushings 210.

Figure 5:
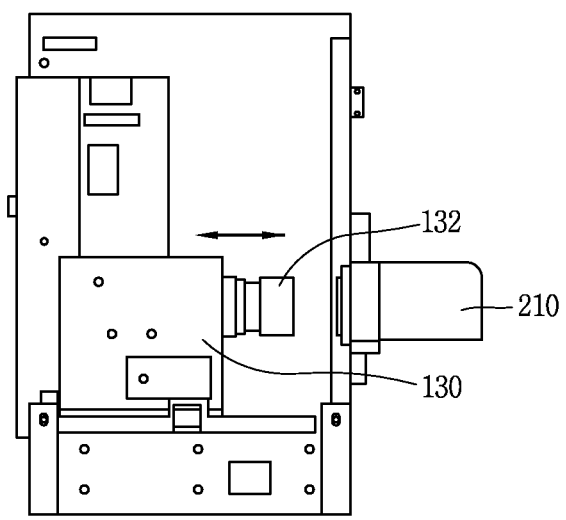
FIG. 5 is a lateral view of the structure of the switchgear with the arc eliminator in accordance with the present invention, which schematically illustrates a state that the arc eliminator is coupled to the bushing.

FIG. 5 is a lateral view of the structure of the switchgear with the arc eliminator in accordance with the present invention, which schematically illustrates a state that the arc eliminator is coupled to the bushings.

As illustrated in FIG. 5, in a state that a front door is closed and a manual operating handle (not illustrated) is inserted through an operation hole (not illustrated), when the manual operating handle is rotated, the arc eliminator 130 is moved forward along rails (not illustrated), which are disposed within a panel, along with the lower cradle conveyer 136.

In response to the arc eliminator 130 moved forward along the rails, the shutter-driving device (see 134 of FIG. 3) opens a shutter plate (not illustrated), which obscures the bushings 210, and accordingly the tulip contacts 132 are inserted into the bushings 210 so as to be brought into contact with internal conductors.

When the tulip contacts 132 are completely brought into contact with the conductors, as illustrated in FIG. 5, the arc eliminator 130 may be located at a service position and the cradle conveyer 136 (see FIG. 3) is not moved any more.

On the other hand, when the manual operation handle is rotated in an opposite direction to switch the arc eliminator 130 from a service position into a test position, the cradle conveyer 136 is moved outward.

In response, the tulip contacts 132 are completely separated from the conductors located within the bushings 210 and moved away from the bushings 210. Accordingly, the shutter-driving device 134 is released and the shutter plate is restored to its original position to obscure the bushings 210.

When the arc eliminator 130 is located at the test position, the cradle conveyer 136 may not be moved outward any more.

Hereinafter, various embodiments of the structure of the switchgear with the arc eliminator according to the present invention will be described with reference to FIGS. 6 to 15.

Examples of the structure of the switchgear with the arc eliminator may include an upstream bus bar structure, a downstream bus bar structure, a riser panel (PNL) structure, a tie PNL structure, and a cable insert structure.

Figure 6:
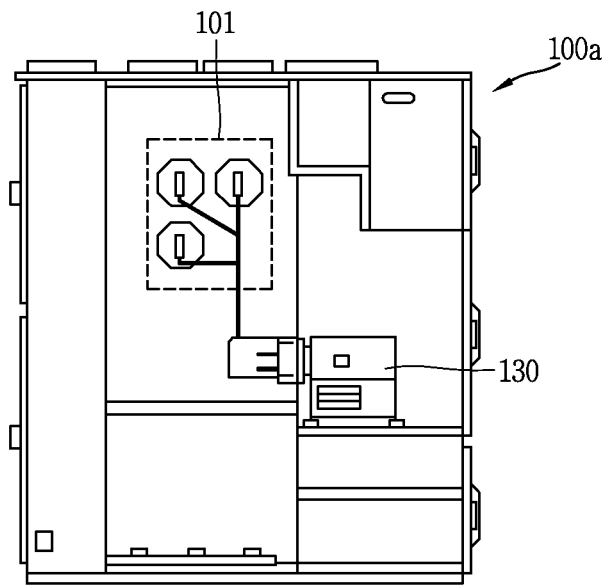
FIG. 6 is a schematic view illustrating the structure of the switchgear with the arc eliminator which is applied to an upstream bus bar structure, in the structure of the switchgear with the arc eliminator in accordance with the present invention.

FIG. 6 is a schematic view illustrating the structure of the switchgear with the arc eliminator which is applied to an upstream bus bar structure, in the structure of the switchgear with the arc eliminator in accordance with the present invention.

Figure 7:
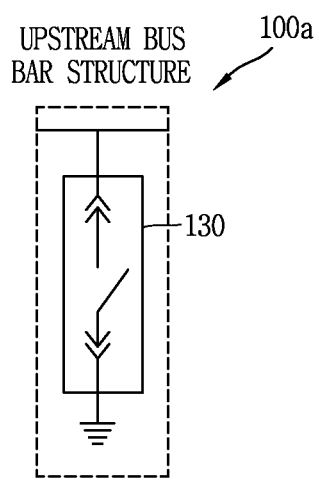
FIG. 7 is a configuration view illustrating an internal circuit of the structure of the switchgear with the arc eliminator which is applied to an upstream bus bar structure, in the structure of the switchgear with the arc eliminator in accordance with the present invention.

FIG. 7 is a configuration view illustrating an internal circuit of the structure of the switchgear with the arc eliminator which is applied to an upstream bus bar structure, in the structure of the switchgear with the arc eliminator in accordance with the present invention.

FIGS. 6 and 7 illustrate a first switchgear 100a which is a first embodiment of the switchgear with the arc eliminator according to the present invention. The structure of the first switchgear 100a is a structure in which the arc eliminator 130 is connected to an upstream bus bar 101. In this instance, the arc eliminator 130 which is connected to the upstream bus bar 101 within the first switchgear 100a may serve to earth the bus bar upon an occurrence of a fault on the bus bar.

In this manner, when an arc fault occurs on the upstream bus bar 101 of the first switchgear 100a, the arc optical sensor 150 (see FIG. 1) which is installed on the corresponding panel detects the arc, and sends a signal to the relay 110 (see FIG. 1) through the slave 140 (see FIG. 1).

Afterwards, the relay 110 recognizes a fault current and sends an operating signal to the arc eliminator control device 120 (see FIG. 1). The arc eliminator control device 120 then fast sends an operating signal to the arc eliminator 130.

Accordingly, when the arc eliminator 130 earths the upstream bus bar 101, the fault current causing the arc flows to the ground through an earthing circuit. This may result in automatically eliminating the arc at the arc-generated portion.

Figure 8:
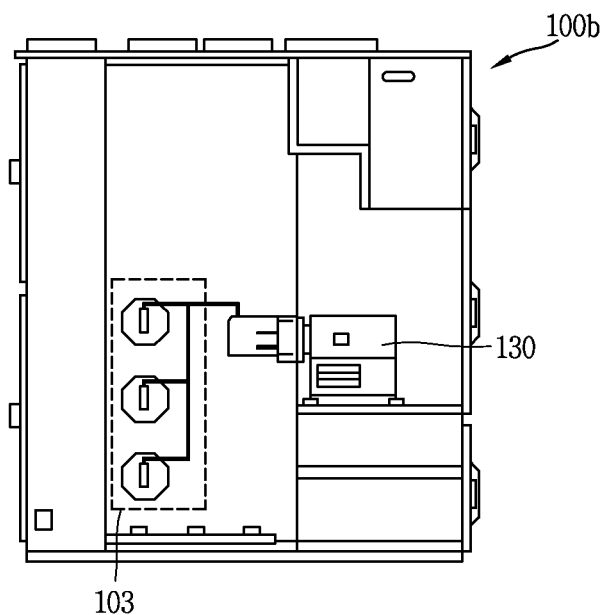
FIG. 8 is a configuration view illustrating the structure of the switchgear with the arc eliminator which is applied to a downstream bus bar structure, in the structure of the switchgear with the arc eliminator in accordance with the present invention.

Meanwhile, FIG. 8 is a configuration view illustrating the structure of the switchgear with the arc eliminator which is applied to a downstream bus bar structure, in the structure of the switchgear with the arc eliminator in accordance with the present invention.

Figure 9:
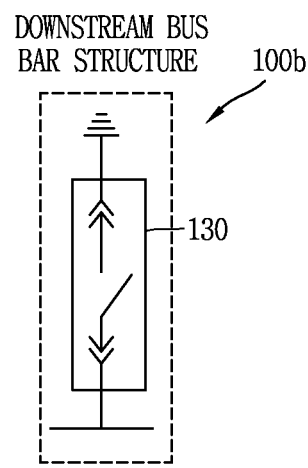
FIG. 9 is a configuration view illustrating an internal circuit of the structure of the switchgear with the arc eliminator which is applied to a downstream bus bar structure, in the structure of the switchgear with the arc eliminator in accordance with the present invention.

FIG. 9 is a configuration view illustrating an internal circuit of the structure of the switchgear with the arc eliminator which is applied to a downstream bus bar structure, in the structure of the switchgear with the arc eliminator in accordance with the present invention.

FIGS. 8 and 9 illustrate a second switchgear 100b which is a second embodiment of the switchgear with the arc eliminator according to the present invention. The structure of the second switchgear 100b is a structure in which the arc eliminator 130 is connected to a downstream bus bar 103. In this instance, the arc eliminator 130 which is connected to the downstream bus bar 103 within the second switchgear 100b may serve to earth the bus bar upon an occurrence of a fault on the bus bar.

In this manner, when an arc fault occurs on the downstream bus bar 103 of the second switchgear 100b, the arc optical sensor 150 (see FIG. 1) which is installed on the corresponding panel detects the arc, and sends a signal to the relay 110 (see FIG. 1) through the slave 140 (see FIG. 1).

Afterwards, the relay 110 recognizes a fault current and sends an operating signal to the arc eliminator control device 120 (see FIG. 1). The arc eliminator control device 120 then fast sends an operating signal to the arc eliminator 130.

Accordingly, when the arc eliminator 130 earths the downstream bus bar 103, the fault current causing the arc flows to the ground through an earthing circuit. This may result in automatically eliminating the arc at the arc-generated portion.

Figure 10:
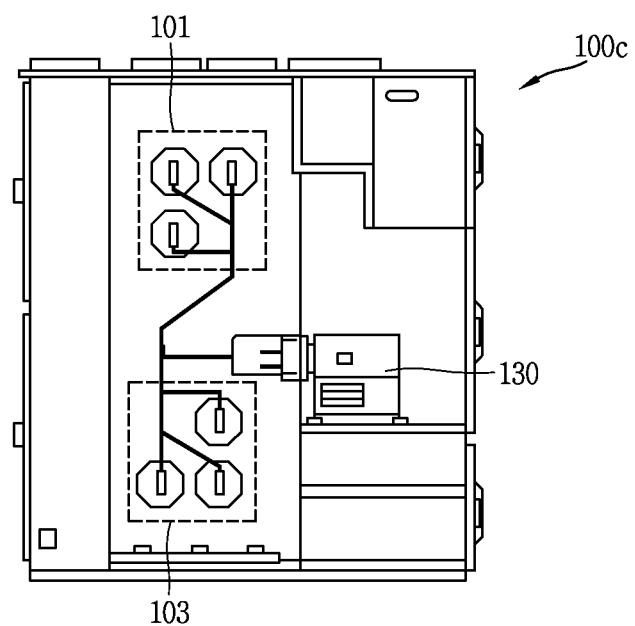
FIG. 10 is a schematic view illustrating the structure of the switchgear with the arc eliminator which is applied to a riser panel structure, in the structure of the switchgear with the arc eliminator in accordance with the present invention.

Meanwhile, FIG. 10 is a schematic view illustrating the structure of the switchgear with the arc eliminator which is applied to a riser panel structure, in the structure of the switchgear with the arc eliminator in accordance with the present invention.

Figure 11:
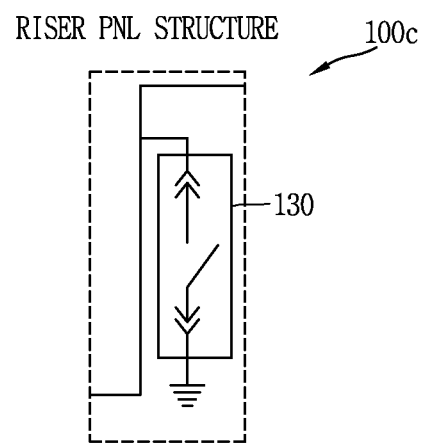
FIG. 11 is a configuration view illustrating an internal circuit of the structure of the switchgear with the arc eliminator which is applied to the riser panel structure, in the structure of the switchgear with the arc eliminator in accordance with the present invention.

FIG. 11 is a configuration view illustrating an internal circuit of the structure of the switchgear with the arc eliminator which is applied to the riser panel structure, in the structure of the switchgear with the arc eliminator in accordance with the present invention.

FIGS. 10 and 11 illustrate a third switchgear 100c which is a third embodiment of the switchgear with the arc eliminator according to the present invention. The structure of the third switchgear 100c is a structure in which the arc eliminator 130 is connected between the upstream bus bar 101 and the downstream bus bar 103. In this instance, the arc eliminator 130 which is connected to the upstream bus bar 101 and the downstream bus bar 103 within third the switchgear 100c may serve to earth the bus bar upon an occurrence of a fault on the bus bar.

In this manner, when an arc fault occurs on the upstream bus bar 101 or the downstream bus bar 103 of the third switchgear 100c, the arc optical sensor 150 (see FIG. 1) which is installed on the corresponding panel detects the arc, and sends a signal to the relay 110 (see FIG. 1) through the slave 140 (see FIG. 1).

Afterwards, the relay 110 recognizes a fault current and sends an operating signal to the arc eliminator control device 120 (see FIG. 1). The arc eliminator control device 120 then fast sends an operating signal to the arc eliminator 130.

Accordingly, when the arc eliminator 130 earths the upstream bus bar or the downstream bus bar 103, the fault current causing the arc flows to the ground through an earthing circuit. This may result in automatically eliminating the arc at the arc-generated portion.

Figure 12:
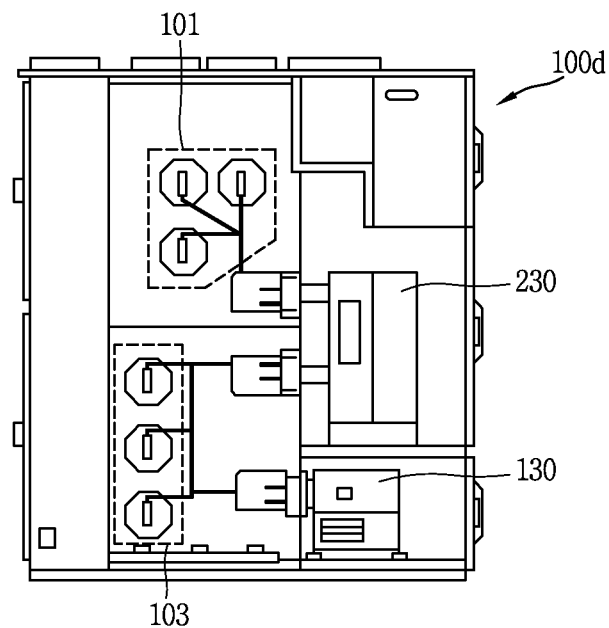
FIG. 12 is a schematic view illustrating the structure of the switchgear with the arc eliminator which is applied to a tie panel structure, in the structure of the switchgear with the arc eliminator in accordance with the present invention.

Meanwhile, FIG. 12 is a schematic view illustrating the structure of the switchgear with the arc eliminator which is applied to a tie panel structure, in the structure of the switchgear with the arc eliminator in accordance with the present invention.

Figure 13:
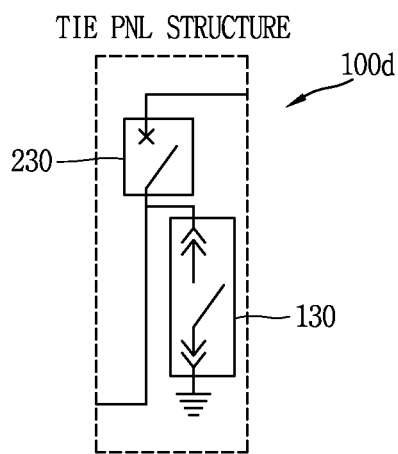
FIG. 13 is a configuration view illustrating an internal circuit of the structure of the switchgear with the arc eliminator which is applied to the tie panel structure, in the structure of the switchgear with the arc eliminator in accordance with the present invention.

FIG. 13 is a configuration view illustrating an internal circuit of the structure of the switchgear with the arc eliminator which is applied to the tie panel structure, in the structure of the switchgear with the arc eliminator in accordance with the present invention.

FIGS. 12 and 13 illustrate a fourth switchgear 100d which is a fourth embodiment of the switchgear with the arc eliminator according to the present invention. The structure of the fourth switchgear 100d is a structure in which the arc eliminator 130 is connected between the upstream bus bar 101 and the downstream bus bar 103 and a tie panel circuit breaker 230 is connected between one of the upstream bus bar 101 and the downstream bus bar 103 and the arc eliminator 130. In this instance, the arc eliminator 130 which is connected to the upstream bus bar 101 and the downstream bus bar 103 within the fourth switchgear 100c may serve to earth the bus bar upon an occurrence of a fault on the bus bar.

In this manner, when an arc fault occurs on one of the upstream bus bar 101 and the downstream bus bar 103 of the fourth switchgear 100d, the arc optical sensor 150 (see FIG. 1) which is installed on the corresponding panel detects the arc, and sends a signal to the relay 110 (see FIG. 1) through the slave 140 (see FIG. 1).

Afterwards, the relay 110 recognizes a fault current and sends an operating signal to the arc eliminator control device 120 (see FIG. 1). The arc eliminator control device 120 then fast sends an operating signal to the arc eliminator 130.

Accordingly, when the arc eliminator 130 breaks one of the upstream bus bar 101 and the downstream bus bar 103 using the tie panel circuit breaker 230 and earths another bus bar, the fault current causing the arc flows to the ground through an earthing circuit. This may result in automatically eliminating the arc at the arc-generated portion. In this instance, the tie panel circuit breaker 230 may serve to connect and protect the bus bars.

Figure 14:
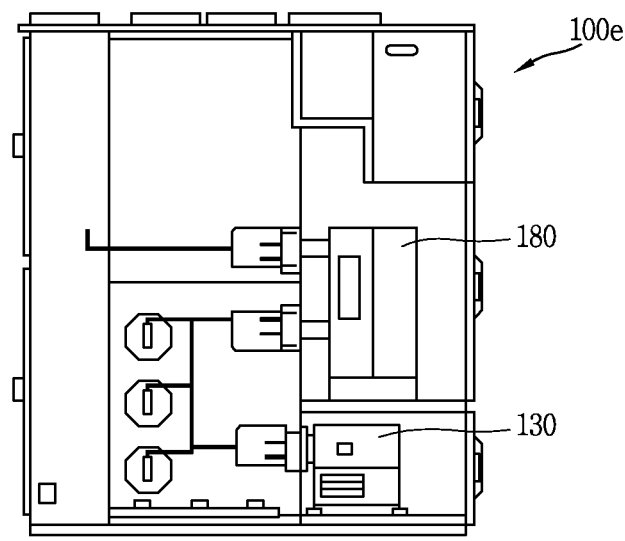
FIG. 14 is schematic view illustrating the structure of the switchgear with the arc eliminator which is applied to a cable insert structure, in the structure of the switchgear with the arc eliminator in accordance with the present invention.

Meanwhile, FIG. 14 is schematic view illustrating the structure of the switchgear with the arc eliminator which is applied to cable insert structure, in the structure of the switchgear with the arc eliminator in accordance with the present invention.

Figure 15:
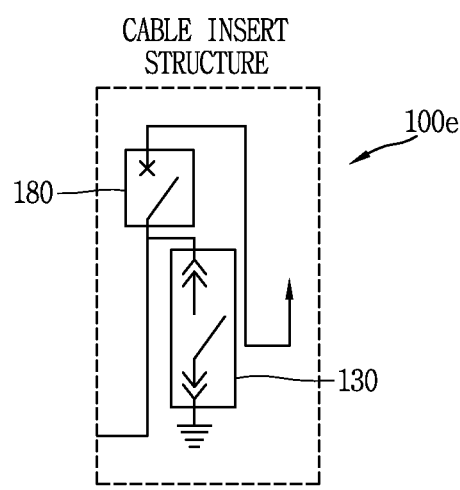
FIG. 15 is a configuration view illustrating an internal circuit of the structure of the switchgear with the arc eliminator which is applied to the cable insert structure, in the structure of the switchgear with the arc eliminator in accordance with the present invention.

FIG. 15 is a configuration view illustrating an internal circuit of the structure of the switchgear with the arc eliminator which is applied to the cable insert structure, in the structure of the switchgear with the arc eliminator in accordance with the present invention.

FIGS. 14 and 15 illustrate a fifth switchgear 100e of the cable insert structure which is a fifth embodiment of the switchgear with the arc eliminator according to the present invention. The structure of the fifth switchgear 100e is a structure in which the arc eliminator 130 is connected to the downstream bus bar 103 and a main circuit breaker 180 is connected between the arc eliminator 130 and the cable insert structure. In this instance, the arc eliminator 130 which is connected to the downstream bus bar 103 within the fifth switchgear 100e may serve to earth the bus bar upon an occurrence of a fault on the bus bar.

In this manner, when an arc fault occurs on the downstream bus bar 103 of the fifth switchgear 100e, the arc optical sensor 150 (see FIG. 1) which is installed on the corresponding panel detects the arc, and sends a signal to the relay 110 (see FIG. 1) through the slave 140 (see FIG. 1).

Afterwards, the relay 110 recognizes a fault current and sends an operating signal to the arc eliminator control device 120 (see FIG. 1). The arc eliminator control device 120 then fast sends an operating signal to the arc eliminator 130.

Accordingly, when the arc eliminator 130 earths the downstream bus bar 103, the fault current causing the arc flows to the ground through an earthing circuit. This may result in automatically eliminating the arc at the arc-generated portion. In this instance, the main circuit breaker 180 may serve to protect an inlet port or an outlet port of the cable.

As described above, a structure of a switchgear with an arc eliminator according to the present invention can minimize a loss due to an arc fault by preventing the arc fault, and allow maintenance of the switchgear in which the arc eliminator is mounted in a pushing and pulling manner.

Specifically, the present invention can be configured such that a relay sends an operating signal upon an occurrence of an arc fault and the arc eliminator fast operates to eliminate the arc. At ordinary times, the arc eliminator is always open and thus current may not flow.

Also, the arc eliminator can be drawn out using a cradle when the arc eliminator is required to be repaired and maintained, which may allow the switchgear to operate in a normal state without being powered off.

Those embodiments have been described with reference to the drawings but the present invention may not be limited to those.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A structure of a switchgear with an arc eliminator in the structure of the switchgear comprising an arc optical sensor to detect an arc, a relay to determine an occurrence or non-occurrence of a fault current by receiving an arc signal detected by the arc optical sensor, and the arc eliminator to earth an arc-generated side bus bar in response to an operating signal with respect to the fault current,
   wherein the arc eliminator is coupled to a cradle conveyer to be horizontally movable back and forth within the switchgear so as to be located at a test position or a service position,
   wherein the structure of the switchgear is provided on a same panel together with the arc eliminator according to a riser panel structure, and
   wherein the riser panel structure is a structure in which the arc eliminator is connected between an upstream bus bar and a downstream bus bar.

2. The structure of claim 1, wherein the structure of the switchgear comprises, in addition to the arc eliminator disposed therein, a plurality of tulip contacts provided on a front surface, a shutter-driving device provided on a side surface, the cradle conveyer provided at a lower surface, and bushings contactable with the tulip contacts.

3. The structure of claim 2, wherein the arc eliminator is placed at the service position in a manner that the arc eliminator moves along rails, the shutter-driving device opens a shutter plate obscuring the bushings, and the tulip contacts are inserted into the bushings to be brought into contact with internal conductors.

4. A structure of a switchgear with an arc eliminator in the structure of the switchgear comprising an arc optical sensor to detect an arc, a relay to determine an occurrence or non-occurrence of a fault current by receiving an arc signal detected by the arc optical sensor, and the arc eliminator to earth an arc-generated side bus bar in response to an operating signal with respect to the fault current,
   wherein the arc eliminator is coupled to a cradle conveyer to be horizontally movable back and forth within the switchgear so as to be located at a test position or a service position,
   wherein the structure of the switchgear is provided on a same panel together with the arc eliminator according to a tie panel structure, and
   wherein the tie panel structure is configured such that the arc eliminator is connected between an upstream bus bar and a downstream bus bar, and a tie panel circuit breaker is connected between one of the upstream bus bar and the downstream bus bar and the arc eliminator.

5. A structure of a switchgear with an arc eliminator in the structure of the switchgear comprising an arc optical sensor to detect an arc, a relay to determine an occurrence or non-occurrence of a fault current by receiving an arc signal detected by the arc optical sensor, and an arc eliminator to earth an arc-generated side bus bar in response to an operating signal with respect to the fault current,
   wherein the arc eliminator is coupled to a cradle conveyer to be horizontally movable back and forth within the switchgear so as to be located at a test position or a service position,
   wherein the structure of the switchgear is provided on a same panel together with the arc eliminator according to a cable insert structure, and
   wherein the cable insert structure is configured such that the arc eliminator is connected to a downstream bus bar, and a main circuit breaker is provided between the arc eliminator and the cable insert structure.

* * * * *